United States Patent
Lampkins et al.

(10) Patent No.: US 10,686,597 B1
(45) Date of Patent: Jun. 16, 2020

(54) SEMI-ROBUST PROTOCOLS FOR SECURE MULTIPARTY COMPUTATION

(71) Applicant: HRL Laboratories, LLC, Malibu, CA (US)

(72) Inventors: Joshua D. Lampkins, Gardena, CA (US); Karim El Defrawy, Santa Monica, CA (US); Benjamin Terner, Goleta, CA (US); Aleksey Nogin, Fresno, CA (US)

(73) Assignee: HRL Laboratories, LLC, Malibu, CA (US)

( * ) Notice: Subject to any disclaimer, the term of this patent is extended or adjusted under 35 U.S.C. 154(b) by 278 days.

(21) Appl. No.: 15/912,393

(22) Filed: Mar. 5, 2018

Related U.S. Application Data

(60) Provisional application No. 62/502,392, filed on May 5, 2017.

(51) Int. Cl.
*H04L 29/06* (2006.01)
*H04L 9/08* (2006.01)

(52) U.S. Cl.
CPC ............ *H04L 9/085* (2013.01); *H04L 9/0894* (2013.01); *H04L 2209/46* (2013.01)

(58) Field of Classification Search
CPC .... H04L 9/085; H04L 9/0894; H04L 2209/46
See application file for complete search history.

(56) References Cited

U.S. PATENT DOCUMENTS

| | | | | |
|---|---|---|---|---|
| 7,003,677 B1* | 2/2006 | Herzberg | ............... | H04L 9/0833 380/286 |
| 2002/0116611 A1* | 8/2002 | Zhou | ....................... | H04L 9/004 713/156 |
| 2007/0076871 A1* | 4/2007 | Renes | ................... | H04L 9/0858 380/201 |

(Continued)

OTHER PUBLICATIONS

Bellare et al., "Robust computational secret sharing and a unified account of classical secret-sharing goals", CCS: Proceedings of the 14th ACM conference on Computer and communications securityOctober, pp. 172-184, Oct. (Year: 2007).*

Zuzana Beerliova-Trubiniova and Martin Hirt. Perfectly-secure mpc with linear communication complexity. In TCC, pp. 213-230, 2008.

(Continued)

*Primary Examiner* — Morshed Mehedi
(74) *Attorney, Agent, or Firm* — Tope-McKay & Associates

(57) ABSTRACT

Described is a system for secure multiparty computation. The system uses a secret sharing protocol to share secrets among servers of a synchronous network. An Open-Semi-Robust protocol or an Open Robust protocol is used to allow the servers to open their shares of secret data. If a server is corrupt, the Open-Robust protocol is used, otherwise, the Open-Semi-Robust protocol is used. A Deal-Semi-Robust protocol or a Deal-Robust protocol is utilized by a server to distribute its shares of secret data among the other servers. If a server is corrupt, the Deal-Robust protocol is used, otherwise, the Deal-Semi-Robust protocol is used. A Recover-Semi-Robust protocol or a Recover-Robust protocol is used to allow servers that were previously corrupted to recover their shares of secret data, such that each uncor- (Continued)

rupted server holds correct shares of secret data. If a server is corrupt, the Recover-Robust protocol is used, otherwise, the Recover-Semi-Robust protocol is used.

18 Claims, 4 Drawing Sheets

(56) References Cited

U.S. PATENT DOCUMENTS

| | | | | |
|---|---|---|---|---|
| 2009/0210712 A1* | 8/2009 | Fort | ................ | H04L 63/1441 713/175 |
| 2010/0031128 A1* | 2/2010 | Obana | ................ | H04L 9/085 714/784 |

OTHER PUBLICATIONS

Shafi Goldwasser and Leonid Levin. Fair Computation of General Functions in Presence of Immoral Majority. In Advances in Cryptology—CRYPTO' 90: Proceedings, pp. 77-93, 1991.
Oded Goldreich. Foundations of Cryptography: vol. 2, Basic Applications. Cambridge University Press, 2009, Chapter 7. pp. 602 and 603.
Yan Huang, Jonathan Katz, and David Evans. Quid-Pro-Quo-tocols: Strengthening Semi-honest Protocols with Dual Execution. In Proceedings of the 2012 IEEE Symposium on Security and Privacy, pp. 272-284, 2012.
Adi Shamir. How to share a secret. Commun. ACM, 22(11): pp. 612-613, 1979.

* cited by examiner

US 10,686,597 B1

SEMI-ROBUST PROTOCOLS FOR SECURE MULTIPARTY COMPUTATION

CROSS-REFERENCE TO RELATED APPLICATIONS

This is a Continuation-in-Part Application of U.S. application Ser. No. 14/313,543, filed in the United States on Jun. 24, 2014, entitled, "System and Method for Cloud Control Operations Plane Based on Proactive Security Algorithms," which is a Non-Provisional Application of U.S. Provisional Application No. 61/838,739, filed in the United States on Jun. 24, 2013, entitled, "Cloud Control Operations Plane Based on Proactive Security Algorithms," the entirety of which are incorporated herein by reference.

This is also a Non-Provisional Application of U.S. Provisional Application No. 62/502,392, filed in the United States on May 5, 2017, entitled, "Semi-Robust Protocols for Secure Multiparty Computation," the entirety of which is incorporated herein by reference.

GOVERNMENT LICENSE RIGHTS

This invention was made with government support under U.S. Government Contract Number HSHQDC-13-C-B0026. The government may have certain rights in the invention.

BACKGROUND OF INVENTION

(1) Field of Invention

The present invention relates to a system for secure multiparty computation and, more particularly, to a system for secure multiparty computation which operates efficiently when no corruptions are present and inefficiently when corruptions are present.

(2) Description of Related Art

Multiparty computation (MPC) allows a group of servers (sometimes called players or parties) to provide inputs to an arithmetic (or Boolean) circuit and securely evaluate the circuit in the presence of an adversary who may corrupt a fixed portion of the servers. When the adversary corrupts a server, it learns all information stored on that server. The adversary can force corrupt servers to behave arbitrarily, irrespective of the protocol. Here, when we say the circuit is evaluated "securely," we mean that the adversary does not learn anything about the inputs of the uncorrupted servers, except what can be deduced from the output of the circuit (which is known to all servers), and that the output of the circuit is correct.

Proactive MPC (or PMPC) is an MPC protocol which still evaluates the circuit securely when the adversary is allowed to corrupt any number of servers, so long as no more than a fixed portion of the servers are corrupt at any given time. Servers are periodically refreshed, and as long as the adversary did not compromise a number of servers larger than the threshold between two consecutive refreshes, the computation is guaranteed to be secure.

Most MPC and PMPC protocols are designed to work optimally in the worst-case scenario, in which it is assumed that server corruptions may be present at any given time. However, in practice, corruptions are normally uncommon occurrences.

Literature Reference No. 2 in the List of Incorporated Literature References describes MPC protocols that are semi-robust. However, this reference assumes the existence of an oblivious transfer protocol. Another related reference is Literature Reference No. 4, but this paper only works in a scenario with two servers.

Thus, it is advantageous to use a protocol with no cryptographic assumptions that operates with any number of servers and works very efficiently when no corruptions are present, even if that protocol is very inefficient when corruptions are present.

SUMMARY OF INVENTION

The present invention relates to a system for secure multiparty computation and, more particularly, to a system for secure multiparty computation which operates efficiently when no corruptions are present and inefficiently when corruptions are present. The system comprises one or more processors and a memory having instructions such that when the instructions are executed, the one or more processors performs multiple operations. The system uses a secret sharing protocol to securely share secrets among a set of servers of a synchronous network, wherein the secrets comprises shares of secret data transmitted electronically via a secure, authenticated broadcast channel. One of an Open-Semi-Robust protocol or an Open Robust protocol is used to allow the set of servers to open their shares of secret data, wherein if a server in the set of servers is corrupt, the Open-Robust protocol is used, otherwise, the Open-Semi-Robust protocol is used. One of a Deal-Semi-Robust protocol or a Deal-Robust protocol is used by a server in the set of servers to distribute its shares of secret data among the other servers, wherein if a server in the set of servers is corrupt, the Deal-Robust protocol is used, otherwise, the Deal-Semi-Robust protocol is used. One of a Recover-Semi-Robust protocol and a Recover-Robust protocol is used to allow servers that were previously corrupted to recover their shares of secret data, such that each uncorrupted server holds correct shares of secret data, wherein if a server in the set of servers is corrupt, the Recover-Robust protocol is used, otherwise, the Recover-Semi-Robust protocol is used.

In another aspect, if no server corruptions occur, the Open-Semi-Robust protocol can open more shares of secret data using a hyper-invertible matrix having a different size than a hyper-invertible matrix used in the Open-Robust protocol.

In another aspect, there are multiple check polynomials in the Deal-Robust protocol and only one check polynomial in the Deal-Semi-Robust protocol.

In another aspect, if no server corruptions occur, the Deal-Semi-Robust protocol reduces a number of broadcasts needed compared to the Deal-Robust protocol.

In another aspect, in the presence of server corruptions, any of the Open-Semi-Robust, Deal-Semi-Robust, and Recover-Semi-Robust protocols can fully recover provided that a corruption threshold is not violated.

In another aspect, the Recover-Semi-Robust protocol uses batch sharing in which multiple secrets are stored in a single polynomial.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
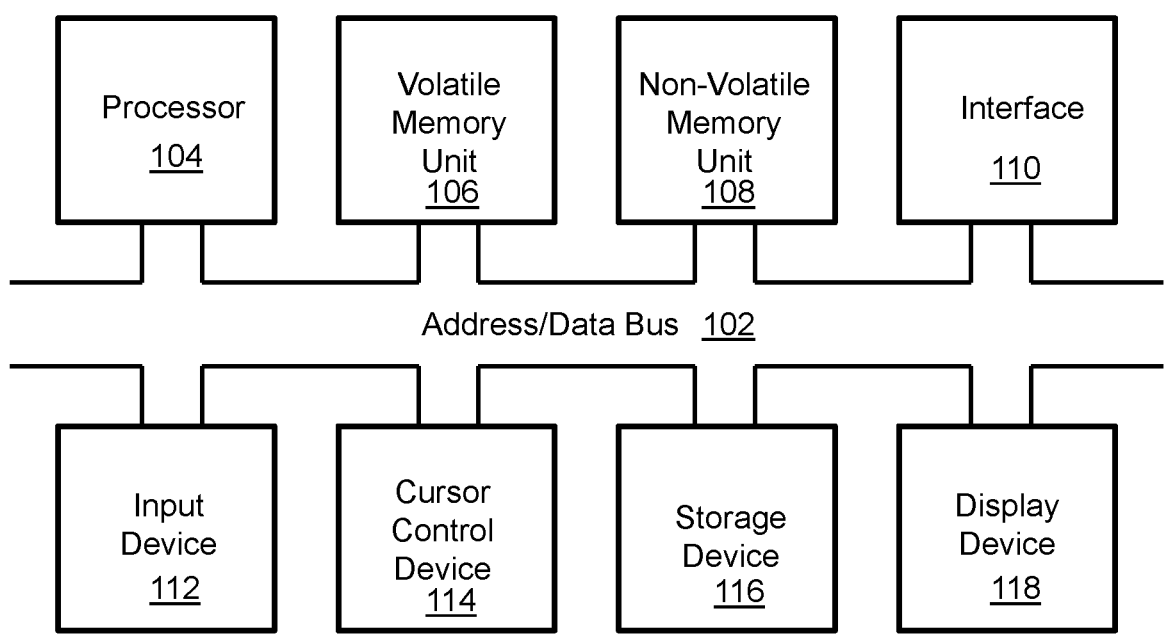
FIG. 1 is a block diagram depicting the components of a system for secure multiparty computation according to some embodiments of the present disclosure.

The present invention relates to a system for secure multiparty computation and, more particularly, to a system for secure multiparty computation which operates efficiently when no corruptions are present and inefficiently when corruptions are present. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number.

1. Zuzana Beerliova-Trubiniova and Martin Hirt. Perfectly-secure mpc with linear communication complexity. In TCC, pages 213-230, 2008.
2. Shafi Goldwasser and Leonid Levin. Fair Computation of General Functions in Presence of Immoral Majority. In Advances in Cryptology-CRYPT0' 90: Proceedings, pages 77-93, 1991
3. Oded Goldreich. Foundations of Cryptography: Volume 2, Basic Applications. Cambridge University Press, 2009.
4. Yan Huang, Jonathan Katz, and David Evans. Quid-Pro-Quo-tocols: Strengthening Semi-honest Protocols with Dual Execution. In Proceedings of the 2012 IEEE Symposium on Security and Privacy, Pages 272-284, 2012.
5. Adi Shamir. How to share a secret. Commun. ACM, 22(11):612-613, 1979.

(2) PRINCIPAL ASPECTS

Various embodiments of the invention include three "principal" aspects. The first is a system for secure multiparty computation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
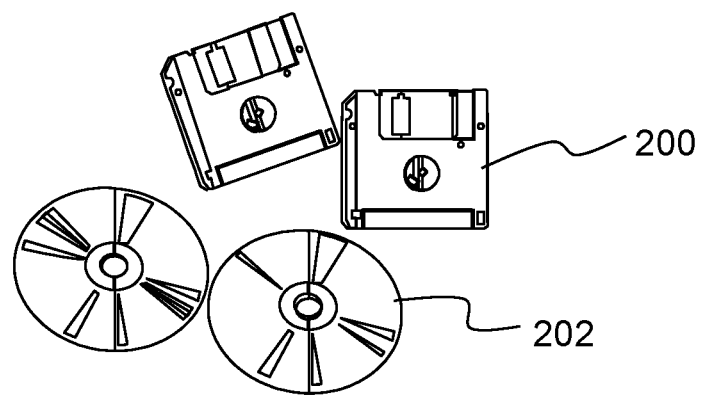
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION (3.1) Basic Preliminaries

The multiparty computation (MPC) protocols in this disclosure take place among a group of n servers. The set of servers is denoted $\{P_i\}_{i=1}^{n}$. The MPC protocols operate on secrets stored in a finite field $Z_p$ for some large prime p. For instance, p may be 256 bits long or longer.

The secret sharing used for MPC is derived from the secret sharing protocol described by Shamir (see Literature Reference No. 5). Secret sharing protocols, such as that described by Shamir, are used as building blocks to build a more intricate protocol. Each server $P_i$ is assigned a nonzero field element $\alpha_i \in Z_p$. For two distinct servers $P_i$ and $P_j$, these values must satisfy $\alpha_i \neq \alpha_j$. Server $P_i$'s share of the secret is $f(\alpha_i)$ for some secret sharing polynomial. For most of the protocols in this disclosure, the secret will be stored in $f(0)$. The only exception is the protocol Deal-Out-Batches, in which multiple secrets are stored in the same polynomial; in this case, the secrets will be stored at $f(\beta_m)$ for m=1, . . . , b, where, b is the batch size (i.e., the number of secrets stored in a polynomial). No value $\beta_m$ may equal any value $\alpha_i$.

A synchronous network model with private point-to-point channels and a secure, authenticated broadcast channel is assumed. These terms are defined in, for instance, chapter 7 of Literature Reference No. 3. The protocols according to embodiments of the present disclosure are statistically secure, meaning that they rely on no cryptographic assumptions (i.e., an assumption that some problem is computationally difficult to solve) and guarantee success of the protocol with a high probability. The threshold of corruption, which is the maximum number of corrupt servers that can be tolerated without corrupting the system, is denoted t. The protocols in this disclosure work with a threshold of t<n/3. For example, if the number of servers, n, is 13, then the threshold t could be 4 or less. However, if subprotocols are used that have a lower corruption threshold, then that threshold will be the corruption threshold of the protocols in this paper.

Some of the protocols require the use of a hyper-invertible matrix (see Literature Reference No. 1 for a description of a hyper-invertible matrix). A hyper-invertible matrix is such that any square submatrix formed by removing rows and columns is invertible. It is shown in Literature Reference No. 1 that one can construct a hyper-invertible matrix as follows: Pick 2a distinct field elements $\theta_1, \ldots, \theta_a$, $\phi_1, \ldots, \phi_a \in Z_p$, and let M be the matrix be such that if $(y_1, \ldots, y_a)^T = M (x_1, \ldots, x_a)^T$, then the points $(\theta_1, y_1), \ldots, (\theta_a, y_a)$ lie on the polynomial of degree $\leq a-1$ which evaluates to $x_j$ at $\phi_j$ for each j=1, . . . , a. In other words, M interpolates the points with x-coordinates $\theta_1, \ldots, \theta_a$ on a polynomial given the points with x-coordinates $\phi_1, \ldots, \theta_a$ on that polynomial. Then any submatrix of M is hyper-invertible.

(4) SPECIFIC DETAILS OF VARIOUS EMBODIMENTS

The protocols in this disclosure offer an advantage in the average-case scenario in which corruptions of MPC servers only happen rarely. The semi-robust protocols in this disclosure operate very efficiently when no corruptions occur, at the cost of operating less efficiently when corruptions do occur. For many MPC applications, this may be a desirable trade-off.

In this disclosure, there are protocols denoted "semi-robust" that work efficiently when no corruptions are present; however, if a corruption occurs during the execution of a semi-robust protocol, the protocol will fail, and a "robust" protocol will be run instead. This re-starting is slow, but in scenarios where corruptions happen rarely, this may not be a prohibitive drawback.

(4.1) Opening Protocols

The protocols in this section allow a group of servers to open a collection of secrets that have already been shared as described above. The protocol Open-Robust detects when a corrupted server is misbehaving and excludes that server from further computation. The protocol Open-Semi-Robust can detect when some server is misbehaving (i.e., not following the protocol specification), but cannot specify which server is corrupt. In step 6 of Open-Semi-Robust, the servers attempt to interpolate polynomials. If this interpolation fails, this means that one of the servers was misbehaving, so the protocol Open Robust is invoked in step 8. Thus, when a fault occurs in Open-Semi-Robust, the protocol Open-Robust is invoked to determine which server was misbehaving.

In terms of efficiency, the primary difference between the two opening protocols is the width of the hyper-invertible matrix used. Since the matrix in Open-Semi-Robust is wider, it can open more sharings than Open-Robust with the same communication bandwidth if no corruptions occur.

(4.1.1) Open-Robust Protocol

Inputs:

Each uncorrupted server $P_i$ has a vector of shares $[f_j(\alpha_i)]_{j=1}^{l}$ for the l secrets that need to be opened. There exists a publicly known n×n−2t−1 hyper-invertible matrix M.

Outputs:

Each server holds the vector of secrets $[f_j(0)]_{j=1}^{l}$.

1. If l is not a multiple of w:=n−2t−1, then extend the vector of input shares to $[f_j(\alpha_i)]_{j=1}^{l'}$, where the last l'−l shares are all zero and l'=⌈l/w⌉w. Otherwise, set l':=l.
2. Letting b:=l'/w, each server $P_i$ locally computes the vector $[g_{kn+1}(\alpha_i), g_{kn+2}(\alpha_i), \ldots, g_{kn+n}(\alpha_i)] = M[f_{kw+1}(\alpha_i), f_{kw+2}(\alpha_i), \ldots, f_{kw+w}(\alpha_i)]$ for k=0, . . . , b−1.
3. For each k=0, . . . , b−1, each server $P_i$ sends $g_{kn+j}(\alpha_i)$ to each server $P_j$.
4. Each server $P_j$ uses the shares received in the previous step to interpolate the secrets $g_{kn+j}(0)$ for each k=0, . . . , b−1.
5. Each server $P_j$ broadcasts the secrets interpolated in the previous step.
6. Using the values broadcast in the previous step, each server interpolates $[f_{kw+1}(0), f_{kw+2}(0), \ldots, f_{kw+w}(0)]$ from $[g_{kn+1}(0), g_{kn+2}(0), \ldots, g_{kn+n}(0)]$ for each k=0, . . . , b−1.
7. If the interpolation algorithm revealed that some value $g_{kn+j}(0)$ was incorrect, then the servers label $P_j$ as corrupt for each such j.
8. The values $[f_j(0)]_{j=1}^{l}$ are taken as output.

(4.1.2) Open-Semi-Robust Protocol

Inputs:

Each server $P_i$ has a vector of shares $[f_j(\alpha_i)]_{j=1}^{l}$ for the l secrets that need to be opened. There exists a publicly known n×n−t hyper-invertible matrix M.

Outputs:

Each server holds the vector of secrets $[f_j(0)]_{j=1}^{l}$.

1. If l is not a multiple of w:=n−t, then extend the vector of input shares to $[f_j(\alpha_i)]_{j=1}^{l'}$, where the last l'−l shares are all zero and l'=⌈l/w⌉w. Otherwise, set l':=l.
2. Letting b:=l'/w, each server $P_i$ locally computes the vector $[g_{kn+1}(\alpha_i), g_{kn+2}(\alpha_i), \ldots, g_{kn+n}(\alpha_i)] = M[f_{kw+1}(\alpha_i), f_{kw+2}(\alpha_i), \ldots, f_{kw+w}(\alpha_i)]$ for k=0, . . . , b−1.
3. For each k=0, . . . , b−1, each server $P_i$ sends $g_{kn+j}(\alpha_i)$ to each server $P_j$.
4. Each server $P_j$ uses the shares received in the previous step to interpolate the secrets $g_{kn+j}(0)$ for each k=0, . . . , b−1.
5. Each server $P_j$ broadcasts the secrets interpolated in the previous step.
6. Using the values broadcast in the previous step, each server interpolates $[f_{kw+1}(0), f_{kw+2}(0), \ldots, f_{kw+w}(0)]$ from $[g_{kn+1}(0), g_{kn+2}(0), \ldots, g_{kn+n}(0)]$ for each k=0, . . . , b−1.
7. If each interpolation in the previous step succeeded, then the values $[f_j(0)]_{j=1}^{l}$ are taken as output and the protocol terminates.

8. If the interpolation algorithm failed for any vector in step 6, then the servers invoke the Open Robust protocol on all the inputs to this protocol.
9. Using the values $[f_j(0)]_{j=1}^l$ output from the Open-Robust protocol (and possibly extending the output with zeros), each server locally computes the vector $[g_{kn+1}(0), g_{kn+2}(0), \ldots, g_{kn+n}(0)] = M[f_{kw+1}(0), f_{kw+2}(0), \ldots, f_{kw+w}(0)]$ for $k=0, \ldots, b-1$.
10. If some $P_j$ broadcast a value for $g_{kn+j}(0)$ in step 5 that does not equal the value revealed by interpolation in the step 9, then the servers label $P_j$ as corrupt for each such j.
11. The values $[f_j(0)]_{j=1}^l$ are taken as output.

(4.2) Dealing Protocols

The protocols in this section allow servers to periodically deal secrets, or in other words, periodically distribute shares of secrets among the other servers. If the Deal-Semi-Robust protocol detects that some node is not following the protocol specification, it invokes the Deal-Robust protocol, which will work even in the presence of faults. In step 6 of Deal-Semi-Robust protocol, the servers check if the values broadcast in step 5 lie on a polynomial of degree t. If they do not, this means that a fault has occurred, and the Deal-Robust protocol is invoked.

The primary efficiency difference between the two protocols is that in the Deal-Robust protocol, there are n check polynomials $\{m_i\}_{i=1}^n$, whereas in the Deal-Semi-Robust protocol, there is only one check polynomial m. This reduces the number of broadcasts in the Deal-Semi-Robust protocol by a factor of n if no corruptions occur.

(4.2.1) Deal-Robust Protocol

Inputs:

Each server $P_i$ holds a vector of secrets $[s_{i,k}]_{k=1}^l$.

Outputs:

Each uncorrupted server $P_i$ holds shares $f_{j,k}(\alpha_i)$ of degree t polynomials for $j=1, \ldots, n$ and $k=1, \ldots, l$.

1. For each $k=1, \ldots, l$, each server $P_i$ creates a degree t polynomial $f_{i,k}$ that is uniformly random subject to the constraint that $f_{i,k}(0)=s_{i,k}$ and $f_{i,k}(\alpha_j)=0$ for each $P_j$ that is in dispute with $P_i$.
2. Each server $P_i$ creates a degree t polynomial $r_i$ that is uniformly random subject to the constraint that $f_{i,k}(\alpha_j)=0$ for each $P_j$ that is in dispute with $P_i$.
3. Each server $P_i$ sends $[f_{i,k}(\alpha_j)]_{k=1}^l$ and $r_i(\alpha_j)$ to each $P_j$.
4. The servers invoke a coin flipping protocol to produce a random value x (uniformly distributed between 0 and p-1).
5. Define the polynomial $m_i$ by $$m_i := r_i + \sum_{k=1}^{\ell} x^k \cdot f_{i,k}.$$

Each server $P_j$ locally computes and broadcasts $m_i(\alpha_1)$ for each $i=1, \ldots, n$.
6. Each $P_i$ locally computes and broadcasts each share of $m_i$.
7. If any server broadcast a value in step 5 that does not match the value broadcast by the dealer in step 6, then a dispute is added for each such pair and the protocol terminates unsuccessfully.
8. If any $m_i$ broadcast in step 6, is not of degree t or does not satisfy $m_i(\alpha_j)=0$ for each $P_j$ in dispute with $P_i$, then label $P_i$ as corrupt and set all $P_i$'s dealt shares to zero.

9. Each server $P_i$ takes $f_{j,k}(\alpha_i)$ as output for $j=1, \ldots, n$ and $k=1, \ldots, l$ and the protocol terminates successfully.

(4.2.2) Deal-Semi-Robust Protocol

Inputs:

Each server $P_i$ holds a vector of secrets $[s_{i,k}]_{k=1}^l$.

Outputs:

Each uncorrupted server $P_i$ holds shares $f_{j,k}(\alpha_i)$ of degree t polynomials for $j=1, \ldots, n$ and $k=1, \ldots, l$.

1. For each $k=1, \ldots, l$, each server $P_i$ creates a degree t polynomial $f_{i,k}$ that is uniformly random subject to the constraint that $f_{i,k}(0)=s_{i,k}$ and $f_{i,k}(\alpha_j)=0$ for each $P_j$ that is in dispute with $P_i$.
2. Each server $P_i$ creates a degree t polynomial $r_i$ that is uniformly random subject to the constraint that $f_{i,k}(\alpha_j)=0$ for each $P_j$ that is in dispute with $P_i$.
3. Each server $P_i$ sends $[f_{i,k}(\alpha_k)]_{k=1}^l$ and $r_i(\alpha_j)$ to each $P_j$.
4. The servers invoke a coin flipping protocol to produce a random value x (uniformly distributed between 0 and p-1).
5. Define the polynomial $$mbm := \sum_{i=1}^{n} x^{i(\ell+1)} \cdot \left(r_i + \sum_{k=1}^{\ell} x^k \cdot f_{i,k}\right) y.$$

Each server $P_j$ locally computes and broadcasts $m(\alpha_j)$.
6. If the shares broadcast in the previous step do not form a polynomial of degree t, then the servers invoke the Deal-Robust protocol repeatedly until it terminates successfully and take the outputs of the successful termination as the output of the protocol. Otherwise, each server $P_i$ takes $f_{j,k}(\alpha_i)$ as output for $j=1, \ldots, n$ and $k=1, \ldots, l$.

The protocols Deal-Inter-Consistent-Sharings-Robust and Deal-Inter-Consistent-Sharings-Semi-Robust below are similar in function and efficiency gain to the protocols Deal-Robust and Deal-Semi-Robust above. The difference is that in the protocols below, the dealer (i.e., the server sharing the secret) creates two sharings of the same value simultaneously, one of degree t and one of degree 2t. Such protocols are useful for performing multiplications in some MPC protocols. Such multiplication protocols are specified here because the protocols below are generic and may apply to a wide variety of MPC protocols.

(4.2.3) Deal-Inter-Consistent-Sharings-Robust Protocol

Inputs:

Each server $P_i$ holds a vector of secrets $[s_{i,k}]_{k=1}^l$.

Outputs:

Each uncorrupted server $P_i$ holds shares $f_{j,k}(\alpha_i)$ and $F_{j,k}(\alpha_i)$ for $j=1, \ldots, n$ and $k=1, \ldots, l$. The polynomials $f_{j,k}$ and $F_{j,k}$ are of degree t and degree 2t, respectively, and for each pair (j,k), the polynomials $f_{j,k}$ and $F_{j,k}$ store the same secret.

1. For each $k=1, \ldots, l$, each server $P_i$ creates degree t and degree 2t polynomials $f_{i,k}$ and $F_{i,k}$, respectively, that are random subject to the constraint that $f_{i,k}(0)=F_{i,k}(0)=s_{i,k}$ and $f_{i,k}(\alpha_j)=F_{i,k}(\alpha_j)=0$ for each $P_j$ that is in dispute with $P_i$.
2. Each server $P_i$ creates degree t and degree 2t polynomials $r_i$ and $R_i$, respectively, that are random subject to the constraint that $r_i(\alpha_j)=R_i(\alpha_j)=0$ for each $P_j$ that is in dispute with $P_i$.
3. Each server $P_i$ sends $[(f_{i,k}(\alpha_j), F_{i,k}(\alpha_j))]_{k=1}^l$ and $(r_i(\alpha_j), R_i(\alpha_j))$ to each $P_j$.

4. The servers invoke a coin flipping protocol to produce a random value x (uniformly distributed between 0 and p−1).
5. Define the polynomial $m_i$ by $$m_i := r_i + \sum_{k=1}^{\ell} x^k \cdot f_{i,k}.$$

Define the polynomial $M_i$ by $$M_i := R_i + \sum_{k=1}^{\ell} x^k \cdot F_{i,k}.$$

Each server $P_j$ locally computes and broadcasts $m_i(\alpha_j)$ and $M_i(\alpha_j)$ for each i=1, . . . , n.

6. Each $P_i$ locally computes and broadcasts each share of $m_i$ and $M_i$.
7. If any server broadcast a value in step 5 that does not match the value broadcast by the dealer in step 6, then a dispute is added for each such pair and the protocol terminates unsuccessfully.
8. If any $m_i$ or $M_i$ broadcast in step 6 is not of degree t or 2t, respectively, or if $m_i$ and $M_i$ do not store the same secret, then label $P_i$ as corrupt and set all $P_i$'s dealt shares to zero.
9. Each server $P_i$ takes $f_{j,k}(\alpha_i)$ and $F_{j,k}(\alpha_i)$ as output for j=1, . . . , n and k=1, . . . , l, and the protocol terminates successfully.

(4.2.4) Deal-Inter-Consistent-Sharings-Semi-Robust Protocol

Inputs:

Each server $P_i$ holds a vector of secrets $[s_{i,k}]_{k=1}^{l}$.

Outputs:

Each uncorrupted server $P_i$ holds shares $f_{j,k}(\alpha_i)$ and $F_{j,k}(\alpha_i)$ for j=1, . . . , n and k=1, . . . , l. The polynomials $f_{j,k}$ and $F_{j,k}$ are of degree t and degree 2t, respectively, and for each pair (j,k), the polynomials $f_{j,k}$ and $F_{j,k}$ store the same secret.

1. For each k=1, . . . , l, each server $P_i$ creates degree t and degree 2t polynomials $f_{i,k}$ and $F_{i,k}$, respectively, that are random subject to the constraint that $f_{i,k}(0) = F_{i,k}(0) = s_{i,k}$ and $f_{i,k}(\alpha_j) = F_{i,k}(\alpha_j) = 0$ for each $P_1$ that is in dispute with $P_i$.
2. Each server $P_i$ creates degree t and degree 2t polynomials $r_i$ and $R_i$, respectively, that are random subject to the constraint that $r_i(\alpha_j) = R_i(\alpha_j) = 0$ for each $P_1$ that is in dispute with $P_i$.
3. Each server $P_i$ sends $[(f_{i,k}(\alpha_j), F_{i,k}(\alpha_j))]_{k=1}^{l}$ and $(r_i(\alpha_j), R_i(\alpha_j))$ to each $P_j$.
4. The servers invoke a coin flipping protocol to produce a random value x (uniformly distributed between 0 and p−1).
5. Define the polynomial m by $$m := \sum_{i=1}^{n} x^{i(\ell+1)} \cdot \left( r_i + \sum_{k=1}^{\ell} x^k \cdot f_{i,k} \right),$$

and define the polynomial M by $$M := \sum_{i=1}^{n} x^{i(\ell+1)} \cdot \left( R_i + \sum_{k=1}^{\ell} x^k \cdot F_{i,k} \right).$$

Each server $P_j$ locally computes and broadcasts $m(\alpha_j)$ and $M(\alpha_j)$.

6. If the shares of m and M broadcast in the previous step do not form polynomials of degree t and 2t, respectively, or if the polynomials m and M store different secrets, then the servers invoke the Deal-Inter-Consistent-Sharings-Semi-Robust protocol repeatedly until it terminates successfully using the input $[s_{i,k}]_{k=1}^{l}$ and take the outputs of the successful termination as the output of this protocol. Otherwise, each server $P_i$ takes $f_{j,k}(\alpha_i)$ and $F_{j,k}(\alpha_i)$ as output for j=1, . . . , n and k=1, . . . , l.

(4.3) Proactive Protocols

The protocols in previous sections apply to generic MPC. The protocols in this section specifically apply to Proactive MPC (or PMPC). In the proactive setting, corruptions may be mobile, such as a virus that moves throughout a network. All servers may eventually become corrupt; however, it is still required that no more than t servers are corrupt at any one time.

For a PMPC protocol to be secure, the servers need a way to perform both refresh and recovery. A refresh updates shares of a secret so that old shares cannot be combined with new shares to gain any information on the secret. Recovery allows servers that were previously corrupted and currently have corrupted data to recover their shares.

An explicit refresh protocol is not provided here, as one can trivially modify the Deal-Robust protocol and the Deal-Semi-Robust protocol to perform refresh as follows. The servers share all zeros, and when opened polynomials are checked for validity, it is also checked that they shares zero. Then the output of these protocols can be added to sharings to refresh them.

As recovery is more complicated, protocols for performing recovery are described below. At the beginning of the protocol, some uncorrupted servers may have incorrect shares due to a previous corruption, but at the end of the protocol, all uncorrupted servers hold correct shares. The primary difference between the Recover-Robust protocol and the Recover-Semi-Robust protocol is that very efficient batch sharing is used (via the subprotocol Deal-Out-Batches) to allow servers to recover their shares with low communication bandwidth. However, the batching lowers the resilience to faults, so if the Recover-Semi-Robust protocol fails, then the Recover-Robust protocol is invoked.

(4.3.1) Recover-Robust Protocol

Inputs:

Each server $P_i$ holds a vector of shares $[s_{i,k}]_{k=1}^{l}$. For at least n−t of the uncorrupted servers, the shares satisfy $s_{i,k} = f_k(\alpha_i)$ for a set of degree t secret-sharing polynomials $[f_k]_{k=1}^{l}$. For any servers whose shares were deleted due to corruption, the shares will be replaced with a default value of zero.

Outputs:

Each uncorrupted server holds correct shares, namely, shares that satisfy $s_{i,k} = f_k(\alpha_i)$.

1. The servers invoke a protocol to generate a sharing of a random value, so that each server $P_i$ receives a share $r(\alpha_i)$. Any efficient protocol from the literature will suffice.

2. The servers invoke the Deal-Robust protocol to allow each server $P_i$ to generate shareings $[g_{i,k}]_{k=1}^l$ of their input shares as well as a sharing $r_i$ of their randomly generated share. More specifically, $g_{i,k}(0)=s_{i,k}$ and $r_i(0)=r(\alpha_i)$ for each i and k.
3. The servers invoke a coin flipping protocol to produce a random value x, uniformly distributed between 0 and p−1. The flipped coin from the Deal-Robust protocol may be reused here instead of re-flipping a new coin.
4. Define check polynomials $c_i$ by $$c_i := \sum_{k=1}^{l} x^k \cdot g_{i,k} + r_i.$$

The servers invoke the Open-Robust protocol on the vector $[c_i]_{i=1}^n$.
5. The servers perform the Berlekamp-Welch algorithm to interpolate the values opened in the previous step, as all the values should lie on a polynomial of degree t. Any node that was deemed to have shared incorrect values is added to a set R of nodes that need recovery.
6. Let H denote the set of the first t+1 servers not in R. Furthermore, let $[\lambda_{i,j}]_{j \in H}$ denote the Lagrange interpolation coefficients for interpolating the share of server $P_i$ from the shares of the servers in H. More explicitly, if f is a polynomial of degree t, then $f(\alpha_i)=\Sigma_{j \in H}\lambda_{i,j}f(\alpha_j)$.
7. Define $g'_{i,k}:=\Sigma_{j \in H}\lambda_{i,j}g_{j,k}$ for each $P_i \in R$. Each server locally computes their share of each $g'_{i,k}$.
8. Each server $P_j$ sends $g'_{i,k}(\alpha_j)$ to each $P_i \in R$ for each k=1, . . . , l.
9. Each server $P_i \in R$ interpolates the shares received in the previous step to compute $g'_{i,k}(0)=s_{i,k}=f_k(\alpha_i)$.

(4.3.2) Deal-Out-Batches Protocol
Inputs:
Each server $P_i$ holds a vector of secrets $[s_{i,k}]_{k=1}^l$. There is a publicly known batch size b≤n−t.
Outputs:
For each uncorrupted server $P_i$, there exist polynomials $g_{i,k}$ for k=1, . . . , ⌈l/b⌉ such that $g_{i,k}(\beta_m)=s_{i,(k-i)b+m}$ for m=1, . . . , b and (k−1)b+m≤l. Each uncorrupted server $P_j$ holds shares $g_{i,k}(\alpha_j)$ for each uncorrupted $P_i$.
1. If l is not a multiple of b, then extend the vector of input secrets to $[s_{i,k}]_{k=1}^{l'}$, where the last l'−l secrets are all zero and l'=⌈l/b⌉b. Otherwise, set l':=l. Let w:=l'/b.
2. Each $P_i$ constructs a vector $[g_{j,k}]_{k=1}^w$ of degree b+t−1 polynomials that are random subject to the constraint that for each k=1, . . . , w, $g_{i,k}(\beta_m)=s_{i,(k-1)b+m}$ for m=1, . . . , b and $g_{i,k}(\alpha_j)=0$ for each $P_j$ in dispute with $P_i$.
3. Each $P_i$ sends $[g_{i,k}(\alpha_j)]_{k=1}^w$ to each $P_j$.

(4.3.2) Recover-Semi-Robust Protocol
Inputs:
Each server $P_1$ holds a vector of shares $[s_{i,k}]_{k=1}^l$. For at least n−t of the uncorrupted servers, the shares satisfy $s_{i,k}=f_k(\alpha_i)$ for a set of degree t secret-sharing polynomials $[f_k]_{k=1}^l$. For any servers whose shares were deleted due to corruption, the shares will be replaced with a default value of zero.
Outputs:
Each uncorrupted server holds correct shares, namely, shares that satisfy $s_{i,k}=f_k(\alpha_i)$.
1. The servers invoke a protocol to generate two sharings of random values, so that each server $P_i$ receives shares $r_1(\alpha_i)$ and $r_2(\alpha_i)$. Any efficient protocol from the literature will suffice.

2. The servers invoke a coin flipping protocol to produce a random value x, uniformly distributed between 0 and p−1.
3. Define a check polynomial c by $$c = \sum_{k=1}^{l} x^k \cdot f_k + r_1.$$

Each server $P_i$ broadcasts $c(\alpha_i)$.
4. The servers perform the Berlekamp-Welch algorithm to interpolate the values broadcast in the previous step. Any node that was deemed to have broadcast incorrect values is added to a set R of nodes that need recovery.
5. The servers invoke the Deal-Out-Batches protocol with a batch size of b=n−t so that each server shares their input vector $[s_{i,k}]_{k=1}^l$. Denote the polynomials that share $P_i$'s input by $[g_{i,k}]_{k=1}^{\lceil l/b \rceil}$, so that $g_{i,k}(\beta_m)=s_{i,(k-1)b+m}$ for m=1, . . . , b and (k−1)b+m≤l.
6. Let H denote the set of the first t+1 servers not in R. Furthermore, let $[\lambda_{i,j}]_{j \in H}$ denote the Lagrange interpolation coefficients for interpolating the share of server $P_i$ from the shares of the servers in H. More explicitly, if f is a polynomial of degree t, then $f(\alpha_i)=\Sigma_{j \in H}\lambda_{i,j}f(\alpha_j)$.
7. Define $g'_{i,k}=\Sigma_{j \in H}\lambda_{i,j}g_{j,k}$ for each $P_i \in R$. Each server locally computes their share of each $g'_{i,k}$.
8. Each server $P_j$ sends $g'_{i,k}(\alpha_j)$ to each $P_i \in R$ for each k=1, . . . , ⌈l/b⌉.
9. Each server $P_i \in R$ interpolates the shares received in the previous step to compute $g'_{i,k}(\beta_m)=s_{i,(k-i)b+m}$ for m=1, . . . , b and (k−1)b+m≤l.
10. Repeat steps 2 through 4, using $r_2$ instead of $r_1$ in step 3. If the Berlekamp-Welch algorithm detects any errors in step 4, then the servers invoke the Recover-Robust protocol. Otherwise, the protocol terminates.

Significantly, in the presence of server corruptions, any of the Semi-Robust protocols can fully recover by invoking the Robust version upon detection of a corrupted/faulty server, provided that a corruption threshold is not violated.

Figure 3:
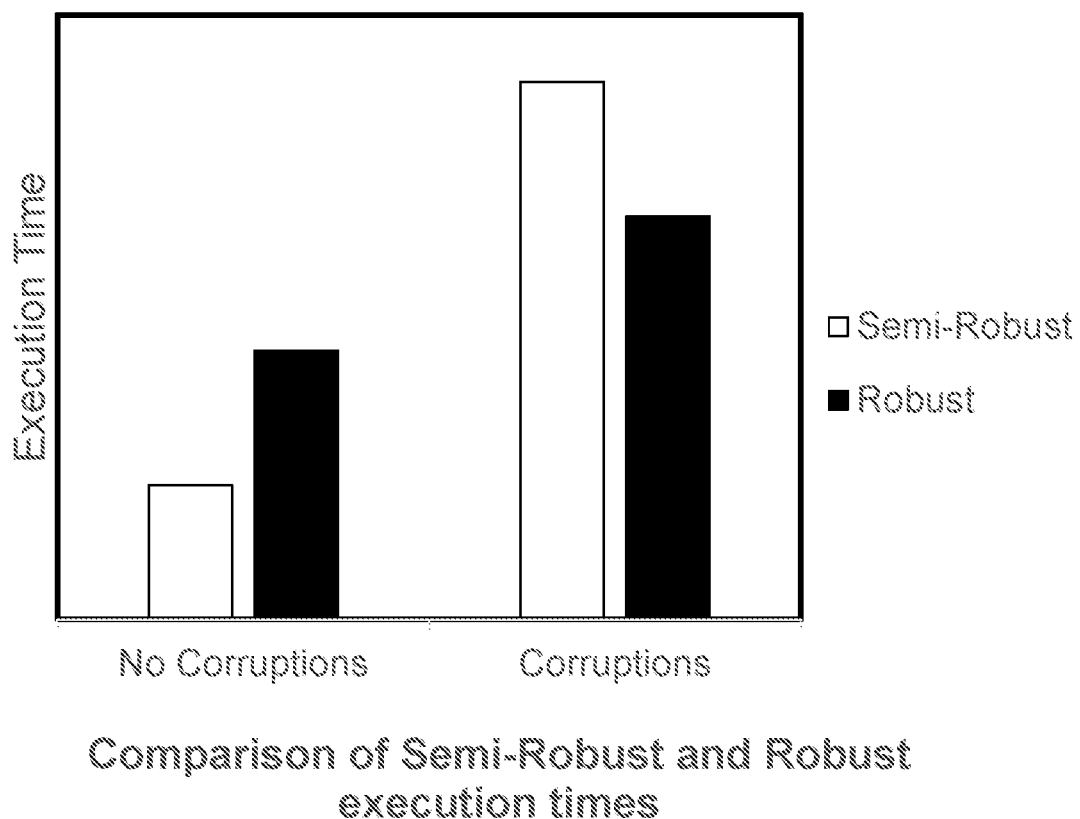
FIG. 3 is a plot illustrating a comparison of semi-robust protocol and robust protocol execution times according to some embodiments of the present disclosure.

FIG. 3 is a plot illustrating a comparison of semi-robust and robust execution times (drawing not to scale). As shown, when no corruptions are present, semi-robust protocols (unfilled bars) have a lower execution time than robust protocols (filled bars). Further, when corruptions are present, semi-robust protocols have a higher execution time than robust protocols. This plot demonstrates that semi-robust protocols work efficiently when no corruptions are present; however, if corruption occurs, execution of semi-robust protocols will fail and robust protocols will be run instead.

Figure 4:
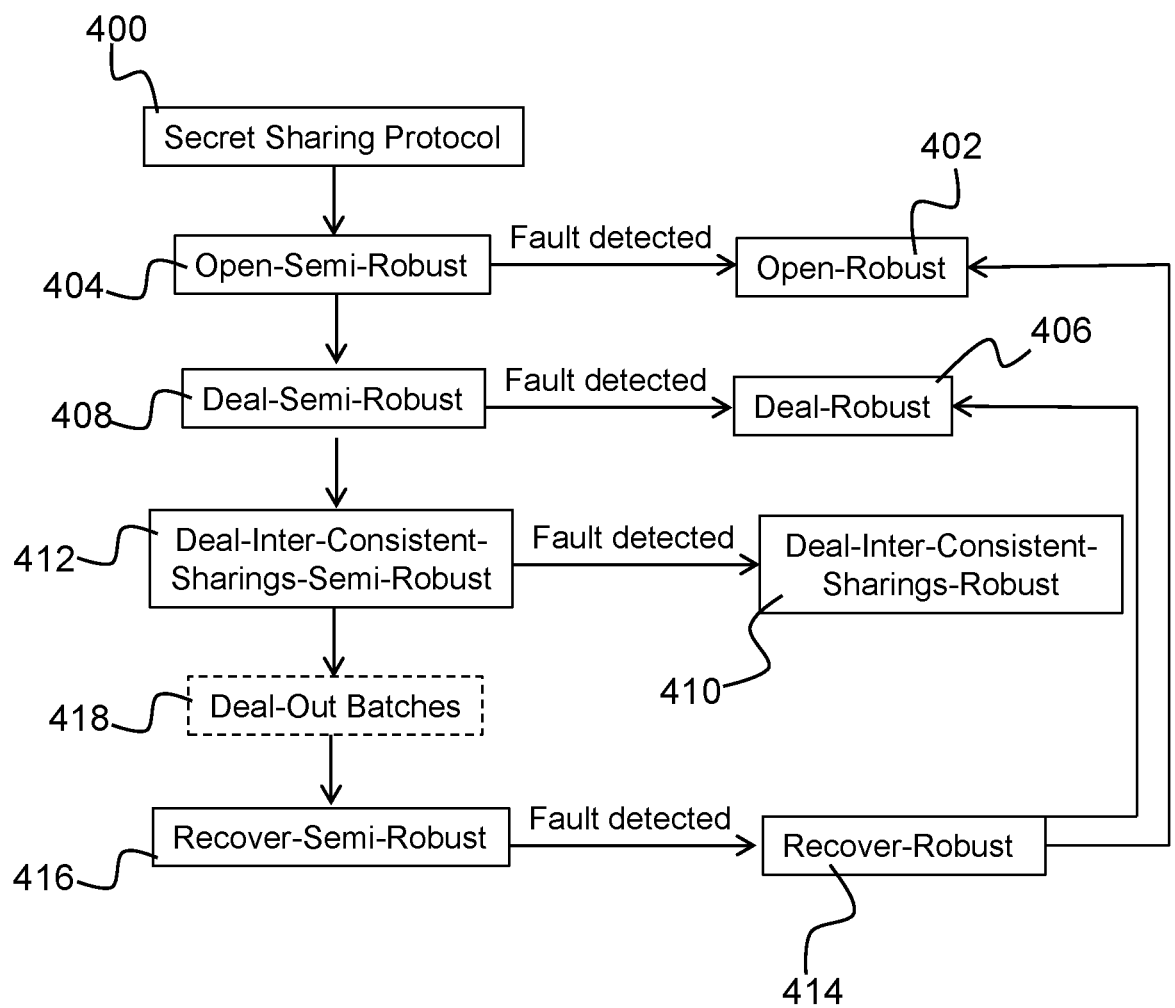
FIG. 4 is a flow diagram illustrating secure multiparty computation according to some embodiments of the present disclosure.

FIG. 4 is a flow diagram illustrating secure multiparty computation according to embodiments of this disclosure. As described in detail above, a secret sharing protocol 400 shares secrets among servers of a network. For the purposes of FIG. 4, "fault detected" refers to corruption being present. If a server in the set of servers is corrupt, then the Open-Robust protocol (element 402) is used to allow the set of servers to open their shares of secret data. If no corruption is present, then the Open-Semi-Robust protocol (element 404) is used.

Next, a server distributes its shares of secret data among the other servers. If corruption is present, then the Deal-Robust protocol (element 406) is used. Otherwise, the Deal-Semi-Robust protocol (element 408) is used. The protocols Deal-Inter-Consistent-Sharings-Robust (element 410) and Deal-Inter-Consistent-Sharings-Semi-Robust (element 412) are similar in function and efficiency gain to the protocols Deal-Robust (element 406) and Deal-Semi-Robust (element 408). Such protocols are useful for performing multiplications in some MPC protocols.

For servers that were previously corrupted, a set of recover protocols allows servers to recover their shares of secret data. If a server in the set of servers is corrupt, the Recover-Robust protocol (element 414) is used, otherwise, the Recover-Semi-Robust protocol (element 416) is used. The primary difference between Recover-Robust (element 414) and Recover-Semi-Robust (element 416) is that very efficient batch sharing is used (via the subprotocol Deal-Out-Batches (element 418)) to allow servers to recover their shares with low communication bandwidth. However, the batching lowers the resilience to faults, so if Recover-Semi-Robust (element 416) fails, then Recover-Robust (element 414) is invoked.

The MPC protocols described herein can be used to perform any form of computation that can be represented by an arithmetic circuit (over a finite field) in a secure and resilient manner. Such a protocol can be used for various forms of computations, including but not limited to: storing and performing computation (and/or data mining, querying, searching, and updating) a distributed database, securing distributed control systems. The protocol can also be used to securely perform computations such as online auctioning and secure voting.

The MPMPC protocol could also be used to realize a resilient and secure control plane to operate, monitor and ensure correct behavior of a cloud computing infrastructure (e.g., could be used to realize the Control and Operations Plane (COP) described in U.S. application Ser. No. 14/313,543, which is hereby incorporated by reference as though fully set forth herein).

As another non-limiting example, the protocol can be used to perform diagnostics via cloud computing. For instance, the protocol disclosed herein would allow a vehicle to distribute sensitive data (such as location, speed, and mileage) among a cloud to perform diagnostics such that the data remains secure even if some of the servers in the cloud are compromised. The recipients of the sensitive data would be a cloud of servers, such as owned by a car manufacturer or insurance company. In this example, the purpose of receiving data would be for use in diagnostics. Diagnostics would include monitoring location, speed, and mileage, possibly for the purpose of detecting vehicle faults or collecting data for insurance companies.

Further, the protocol according to embodiments of the present disclosure could be used for distributed computation performed by unmanned aerial vehicles (UAVs). For example, in a group of UAVs collecting data, each individual UAV could distribute the data it collects among the group, and the group could then perform computations on the data. The protocol would ensure that capturing or destroying some fraction of the UAVs does not reveal any hidden data or disrupt the computation.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for secure multiparty computation, the system comprising:
   one or more processors and a non-transitory computer-readable medium having executable instructions encoded thereon such that when executed, the one or more processors perform operations of:
   using a secret sharing protocol to securely share secrets among a set of servers of a synchronous network, wherein the secrets comprises shares of secret data transmitted electronically via a secure, authenticated broadcast channel;
   using one of an Open-Semi-Robust protocol or an Open-Robust protocol to allow the set of servers to open their shares of secret data,
   wherein if a server in the set of servers is corrupt, the Open-Robust protocol is used, otherwise, the Open-Semi-Robust protocol is used;
   using one of a Deal-Semi-Robust protocol or a Deal-Robust protocol, by a server in the set of servers, to distribute its shares of secret data among the other servers,
   wherein if a server in the set of servers is corrupt, the Deal-Robust protocol is used, otherwise, the Deal-Semi-Robust protocol is used; and
   using one of a Recover-Semi-Robust protocol and a Recover-Robust protocol to allow servers that were previously corrupted to recover their shares of secret data, such that each uncorrupted server holds correct shares of secret data,
   wherein if a server in the set of servers is corrupt, the Recover-Robust protocol is used, otherwise, the Recover-Semi-Robust protocol is used.

2. The system as set forth in claim 1, wherein if no server corruptions occur, the Open-Semi-Robust protocol can open more shares of secret data using a hyper-invertible matrix having a different size than a hyper-invertible matrix used in the Open-Robust protocol.

3. The system as set forth in claim 1, wherein there are multiple check polynomials in the Deal-Robust protocol and only one check polynomial in the Deal-Semi-Robust protocol.

4. The system as set forth in claim 3, wherein if no server corruptions occur, the Deal-Semi-Robust protocol reduces a number of broadcasts needed compared to the Deal-Robust protocol.

5. The system as set forth in claim 1, wherein in the presence of server corruptions, any of the Open-Semi-Robust, Deal-Semi-Robust, and Recover-Semi-Robust protocols can fully recover provided that a corruption threshold is not violated.

6. The system as set forth in claim 1, wherein the Recover-Semi-Robust protocol uses batch sharing in which multiple secrets are stored in a single polynomial.

7. A method for secure multiparty computation, comprising an act of causing one or more processors to execute instructions stored on a non-transitory memory such that upon execution, the one or more processors perform operations of:
   using a secret sharing protocol to securely share secrets among a set of servers of a synchronous network, wherein the secrets comprises shares of secret data transmitted electronically via a secure, authenticated broadcast channel;

using one of an Open-Semi-Robust protocol or an Open-Robust protocol to allow the set of servers to open their shares of secret data, wherein if a server in the set of servers is corrupt, the Open-Robust protocol is used, otherwise, the Open-Semi-Robust protocol is used;

using one of a Deal-Semi-Robust protocol or a Deal-Robust protocol, by a server in the set of servers, to distribute its shares of secret data among the other servers, wherein if a server in the set of servers is corrupt, the Deal-Robust protocol is used, otherwise, the Deal-Semi-Robust protocol is used; and using one of a Recover-Semi-Robust protocol and a Recover-Robust protocol to allow servers that were previously corrupted to recover their shares of secret data, such that each uncorrupted server holds correct shares of secret data, wherein if a server in the set of servers is corrupt, the Recover-Robust protocol is used, otherwise, the Recover-Semi-Robust protocol is used.

8. The method as set forth in claim 7, wherein if no server corruptions occur, the Open-Semi-Robust protocol can open more shares of secret data using a hyper-invertible matrix having a different size than a hyper-invertible matrix used in the Open-Robust protocol.

9. The method as set forth in claim 7, wherein there are multiple check polynomials in the Deal-Robust protocol and only one check polynomial in the Deal-Semi-Robust protocol.

10. The method as set forth in claim 9, wherein if no server corruptions occur, the Deal-Semi-Robust protocol reduces a number of broadcasts needed compared to the Deal-Robust protocol.

11. The method as set forth in claim 7, wherein in the presence of server corruptions, any of the Open-Semi-Robust, Deal-Semi-Robust, and Recover-Semi-Robust protocols can fully recover provided that a corruption threshold is not violated.

12. The method as set forth in claim 7, wherein the Recover-Semi-Robust protocol uses batch sharing in which multiple secrets are stored in a single polynomial.

13. A computer program product for secure multiparty computation, the computer program product comprising:

computer-readable instructions stored on a non-transitory computer-readable medium that are executable by a computer having one or more processors for causing the processor to perform operations of:

using a secret sharing protocol to securely share secrets among a set of servers of a synchronous network, wherein the secrets comprises shares of secret data transmitted electronically via a secure, authenticated broadcast channel;

using one of an Open-Semi-Robust protocol or an Open-Robust protocol to allow the set of servers to open their shares of secret data, wherein if a server in the set of servers is corrupt, the Open-Robust protocol is used, otherwise, the Open-Semi-Robust protocol is used;

using one of a Deal-Semi-Robust protocol or a Deal-Robust protocol, by a server in the set of servers, to distribute its shares of secret data among the other servers, wherein if a server in the set of servers is corrupt, the Deal-Robust protocol is used, otherwise, the Deal-Semi-Robust protocol is used; and using one of a Recover-Semi-Robust protocol and a Recover-Robust protocol to allow servers that were previously corrupted to recover their shares of secret data, such that each uncorrupted server holds correct shares of secret data, wherein if a server in the set of servers is corrupt, the Recover-Robust protocol is used, otherwise, the Recover-Semi-Robust protocol is used.

14. The computer program product as set forth in claim 13, wherein if no server corruptions occur, the Open-Semi-Robust protocol can open more shares of secret data using a hyper-invertible matrix having a different size than a hyper-invertible matrix used in the Open-Robust protocol.

15. The computer program product as set forth in claim 13, wherein there are multiple check polynomials in the Deal-Robust protocol and only one check polynomial in the Deal-Semi-Robust protocol.

16. The computer program product as set forth in claim 15, wherein if no server corruptions occur, the Deal-Semi-Robust protocol reduces a number of broadcasts needed compared to the Deal-Robust protocol.

17. The computer program product as set forth in claim 13, wherein in the presence of server corruptions, any of the Open-Semi-Robust, Deal-Semi-Robust, and Recover-Semi-Robust protocols can fully recover provided that a corruption threshold is not violated.

18. The computer program product as set forth in claim 13, wherein the Recover-Semi-Robust protocol uses batch sharing in which multiple secrets are stored in a single polynomial.

* * * * *